July 3, 1956     S. TESZNER     2,753,496

COMPLEXES OF MULTI ELECTRODE SEMI-CONDUCTORS

Filed Feb. 19, 1951     2 Sheets—Sheet 1

Inventor
Stanislas Teszner
By Michael S. Striker

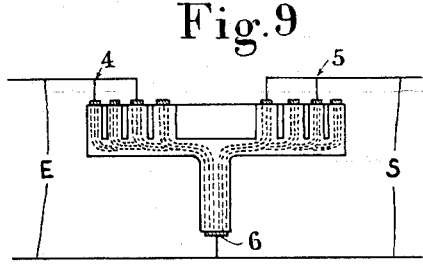
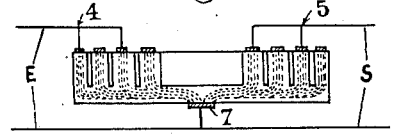
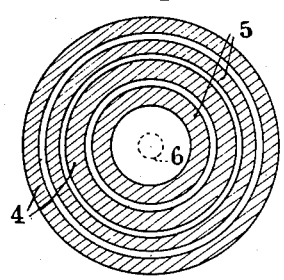
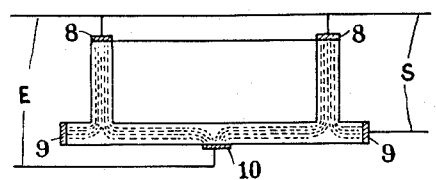
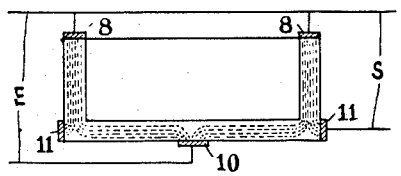
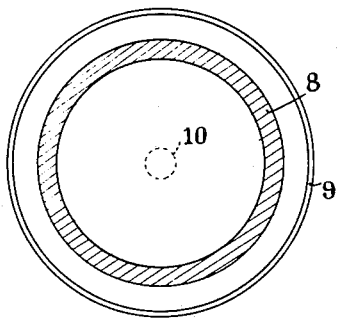

United States Patent Office 2,753,496
Patented July 3, 1956

2,753,496
COMPLEXES OF MULTI ELECTRODE SEMI-CONDUCTORS

Stanislas Teszner, Paris, France

Application February 19, 1951, Serial No. 211,613

Claims priority, application France February 21, 1950

4 Claims. (Cl. 317—235)

This invention relates to semi-conductor complexes. Semi-conductor complexes are known which consist of agglomerate of granular semi-conductors in contact with one another, forming parallel chains interconnected if desired by transverse links. According to the manufacturing processes and semi-conductive substances utilized, the conductivity of these complexes may be more or less pronounced and influenced either by the voltage fed to their terminals, or by the temperature. In all cases they have the non-linear current-voltage characteristic, current variations occurring as a rule, much more rapidly than voltage variations but not in proportion thereto.

Semi-conductor complexes having a conductivity characteristic varying especially with the voltage applied thereto may consist, for example, of granular silicon carbide agglomerated with clay, the mixture being subsequently sintered under high pressure and temperature.

Semi-conductor complexes having a conductivity varying rapidly with the change of temperature may be obtained, for example, by using metal oxide granules subjected to a high pressure and baked at a temperature sufficient to cause the granules to sinter.

Both types of complexes as defined broadly in the last two paragraphs have already been used in a wide field of application, the former mainly for limiting and regularizing the voltage, and for current modulation, and the latter for measuring, and balancing the effects of, temperatures, detecting and limiting power, etc. Various applications derived from the above have been devised and used practically, yet in all cases these complexes have been utilized in the form of diodes, i. e. with only one input and one output electrode.

Now, the applicants have found that a considerable technical improvement in and a great extension of the field of applications of these complexes could be obtained if it were possible to produce multi-electrode complexes operating in a manner similar to thermionic valve and, more particularly, adapted to produce a power amplification.

The object of this invention is to provide a novel conception of semi-conductor complexes permitting the rational utilization of the principle of multi-electrodes by considering more particularly yet without any restrictive condition the case of triode-complexes comprising a pair of input electrodes and a pair of output electrodes, one electrode of each pair being common to the other, and adapted to produce a power amplification due to the non-linearity of the current-voltage characteristic of the complex.

The first idea that occurs, by analogy with thermionic triodes, is to control the action of the complex by means of an input electrode disposed in the fashion of a grid between the pair of output electrodes, one of these being common to the input. This arrangement, illustrated diagrammatically in Fig. 1 of the attached drawings, E being the input and S the output, will be called series-control arrangement for the purpose of this description. In the figure, $P_1$ is the input source the power of which is to be amplified, $P_2$ the output source, $P_P$ the biasing source, according to the conventional technique of thermionic valve control, and Z is the output impedance.

If the complex is characterized by a rapid variation of the current with the voltage expressed by the approximated relation:

$$I = AU^k$$

where I is the current and U the voltage, A a constant and $k$ a factor of the order of 4 to 5 for instance, it may be assumed that a relatively moderate variation of the voltage between $b$ and $c$ will have a consequential effect on the output between these same terminals and, therefore, between $a$ and $c$. Now, as the voltage between $a$ and $c$ (output voltage) is much higher than the voltage between $b$ and $c$, a substantial amplification of the input power would result.

In fact, as it could be expected from the theory and as confirmed by practical tests made by the applicants, this amplification does not occur owing to a self-compensation phenomenon consisting in that the potential at $b$ is mainly produced by the source $P_2$, the contribution from sources $P_1$ and $P_2$ consisting merely of a $+$ or $-$ make-up current. Thus, for instance, if the voltage between $b$ and $c$ has a tendency to rise due to a positive contribution from $B_1$ whereby the resistance between these terminals will drop, this rise will be counteracted by the fact that the resistor $b$—$c$ will then tend to take a smaller portion of the potential difference produced by $P_2$ between $a$ and $c$. As both effects will compensate each other to a considerable extent no appreciable amplification can be obtained thereby.

Subsequently, the applicants have used a parallel-type control which is a specific feature of this invention. The efficiency of this parallel-type control has been further improved owing to a novel construction of the complexes whereby an electromagnetic interaction of the up and down electronic fluxes is produced, thereby increasing the variations of the output power according to the variations of the input power. This interaction is obtained by a lamination of the electronic fluxes which is another specific feature of the present invention.

The following description of triode-complexes, of diagrams corresponding thereto and some practical embodiments given for the purpose of illustrating the manner in which they operate, will afford a better understanding of the nature, advantages and bearing of this invention. Reference will be made to the other figures of the attached drawings, in which:

Figs. 4 to 14 are elevational sections and plane views illustrating diagrammatically three-electrode complexes corresponding to the diagrams of Figs. 2 or 3, with a lamination and a more or less pronounced interaction of the up and down electronic fluxes.

Figure 1:
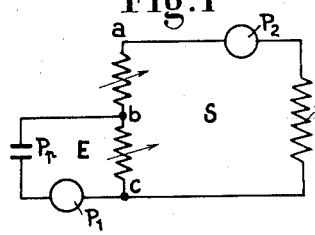
Figure 2:
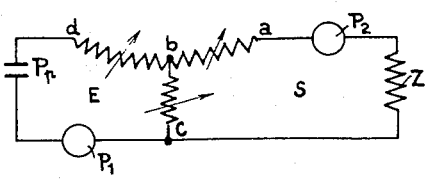
Fig. 2 is a diagram showing the principle of a parallel-type control for a three-electrode complex.

Referring first to the diagram of Fig. 2, the $b$—$c$ portion of the variable (also called "non-ohmic") resistor is common to both input and output circuits, portion $d$—$b$ is a resistor portion peculiar to the output circuit, whilst the other symbols are the same as in Fig. 1.

Figure 3:
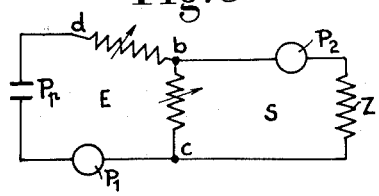
Fig. 3 is a simplified diagram derived from that of Fig. 2.

Under these conditions, if the potential at $b$ tends to change due to the action of the source $P_1$, the effect produced by the source $P_2$ will assist in maintaining this potential, yet this effect may be moderate if the resistance $a$—$b$ is selected with a sufficiently low value in relation to the resistance $b$—$c$ and if the output impedance Z is not too high. The essential role of the resistor portion $d$—$b$ is to avoid a too narrow coupling between the input and output circuits. To the limit, the $a$—$b$ portion may be completely eliminated and the diagram of Fig. 3 obtained thereby.

However the presence of a resistor portion d—b which characterizes this parallel-type control diagram will combine advantages with drawbacks. In fact, one portion only of the voltage supplied by $P_1$ will be fed to the point b, thus imparting thereto a poor amplifying efficiency although it is higher than that obtained with the arrangement of Fig. 1.

However, the gain in amplification, according to the invention, is brought to a high value owing to an electromagnetic interaction combined with the lamination of the up and down electronic fluxes within the complex itself. Figs. 4 to 14 illustrate various examples of possible embodiments of this principle.

Figure 4:
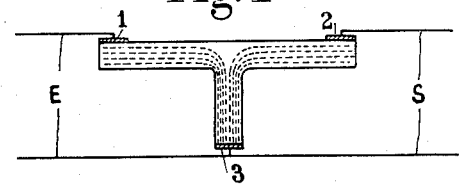
Figure 5:
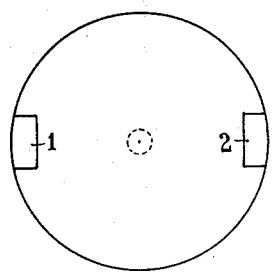

Figs. 4 and 5 show diagrammatically a mushroom-shaped complex in elevational section and in plane view, respectively. The input electrodes are designated with the reference numerals 1, 3 and the output electrodes with 2, 3. The paths of the up and down electronic fluxes are shown in dotted lines in Fig. 4. The electric wiring diagram shown corresponds to that of Fig. 2 except that an interaction of the electronic fluxes occurs from the very entry of the vertical element of the mushroom-shaped body. This interaction has two aspects. On the one hand, due to the electric action produced the potential gradient in the portion concerned will rise more or less according as the fluxes have the same or opposite directions. On the other hand, the magnetic action produced will cause the fluxes to be attracted or repulsed. Regarding the current flowing in the output circuit 2, 3 this will rise or fall respectively. Now, owing to the non-linear characteristics of the complex, it is admissible that a flux 1, 3 having a relatively low value $P_1$ may produce a much more accentuated variation in the power $\Delta P_2$ of the flux 2, 3.

Figure 6:
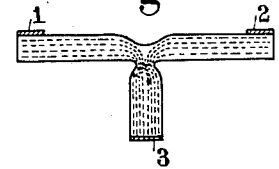

Besides, it will be readily understood that the closer the coupling produced between these fluxes in the suitable portion of the complex, the greater the effect described above. The object of the more intricate form of the complex illustrated in Fig. 6 is to meet this requirement. This diagram is the same as that shown in Fig. 4 save that the coupling is made closer and the interaction stronger by constricting the portion by which the vertical and horizontal elements of the mushroom-shaped body are joined to each other so as to produce a lamination of the fluxes. This constriction may be accompanied by, or replaced with, another, positioned in the vertical stem of the mushroom-shaped body but not shown in the figure.

Figure 7:
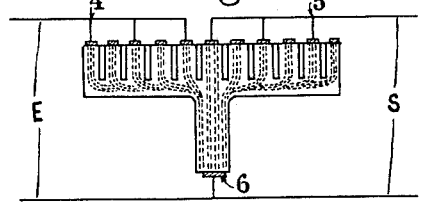
Figure 8:
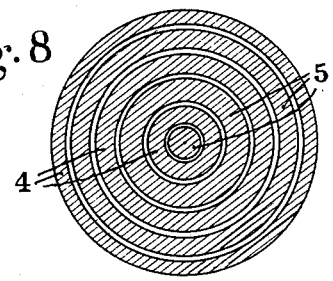

The arrangement of the complex illustrated Fig. 7 in diagrammatical sectional elevation and Fig. 8 in plane view is based on the same principle as disclosed above, but it permits of controlling greater powers. By using concentric annular electrodes 5, 4 connected alternately to the in and output circuits of the system, the outputs obtained exceed greatly those produced with the arrangements of Figs. 4–6 and, on the other hand, it will be noted that the interaction of the fluxes (illustrated in dotted lines Fig. 7) will be more pronounced in this instance, particularly in the junction zone of the horizontal plate with the vertical stem of the mushroom-shaped body. The purpose of the annular grooves separating the electrodes 4 from the electrodes 5 is to attenuate as far as possible strays produced between 4 and 5.

However, as the laminating effect is more pronounced for peripheral than central fluxes in the complex under consideration, it will be advantageous to hollow out the central portion of the complex whereby an arrangement of the type illustrated in Figs. 9 and 10 will be obtained. As the vertical central portion may be dispensed with, without any substantial drawback, the cup-shaped embodiment of Fig. 11 is readily obtained wherein the common electrode 7 is fixed to the centre or in the central area of the cup bottom.

This cup shape admits of many modified embodiments such as those illustrated either in elevational section in Fig. 12 and plane view in Fig. 13, wherein the input electrodes are 8 and 10 and the output electrodes 8 and 9 (or conversely), or in elevational section only Fig. 14 in which the horizontal lateral extension is omitted, the electrode 9 being substituted for the electrode 11. This last and particularly simple form has enabled the applicants to obtain amplifications of the power variations between in and output of the order of 100 times, i. e. 20 decibels, in static operation (direct current), this gain concerning of course the short-circuited output.

It will be noted that with in and output voltages and currents oscillating at a more or less high frequency, the interaction effect of the up and down electronic fluxes as well as the gain in amplification resulting therefrom may be emphasized by a resonance or quasi-resonance phenomenon.

Besides, although this description relates only to three-electrode complexes, it will be obvious to those skilled in the art that the above-disclosed principle of interaction is still applicable to a greater number of electrodes. Thus, for example, referring to the complexes illustrated in Figs. 7 to 11, by simply suppressing the connections either between electrodes 4 in parallel or between the electrodes 5, or still by simultaneously suppressing all connections, a multi-electrode complex will be obtained. Obviously, this modification opens a wide field of application.

Preferably also, the internal structure of the semiconductor complexes should be such as to cause the current to vary as much as possible with the voltage applied to the terminals. It is therefore possible to use complexes consisting of silicon carbide granules with a binder, and, preferably, those comprising, in addition, secondary-emitter particles as disclosed in the U. S. patent appl. Ser. No. 81,588 filed on March 15, 1949, one of the applicants and the Société le Carbone-Lorraine for "Improvements in Electronic Semi-Conductor Complexes." However, it is also possible to choose complexes of metal oxide granules or having any other suitable internal structures. Furthermore, ionic complexes (in which case ionic fluxes are substituted for the electronic fluxes mentioned above) or still miscellaneous crystals may be used advantageously without departing from the field of the invention, provided the above-specified technical requirement is met.

Finally, it will be understood that the complexes described and illustrated in this specification are given solely by way of illustrative example and that many modifications as to structures, connections, shapes, materials and applications may be brought thereto without departing from the spirit and scope of the present invention.

What I claim as new is:

1. A transistor, comprising, in combination, a disc-shaped member having a centrally located depending portion extending in a direction transverse to said disc-shaped member, said disc-shaped member being formed of an agglomerate of semi-conductive granular particles making electrical contact with each other; a first terminal connected to the upper surface of said disc-shaped member adjacent the outer edge thereof; a second terminal connected to the upper surface of said disc-shaped member and positioned diametrically opposite first said terminal and a third electrode connected to the lower surface of said depending portion whereby the granular particles between said first and third terminals form the input circuit of the transistor and the granular particles between said second and third terminals form the output circuit of the transistor so that any change in the current flowing between said first and third electrodes produces an amplified change in the current flowing between said second and third electrodes.

2. Apparatus as claimed in claim 1 wherein the thickness of said depending portion is decreased at the point where it makes contact with said disc-shaped member.

3. Apparatus as claimed in claim 1 wherein said first terminal includes a plurality of spaced annular conductive elements connected to the upper surface of said disc-shaped member, and said second terminal includes a plurality of annular conductive elements similarly located but spaced alternately between the elements of said first terminal.

4. Apparatus as claimed in claim 1 wherein a cup-shaped channel is formed in the central portion of said disc-shaped member.

References Cited in the file of this patent

UNITED STATES PATENTS

| | | |
|---|---|---|
| 2,524,035 | Bardeen | Oct. 3, 1950 |
| 2,553,490 | Wallace | May 15, 1951 |
| 2,560,594 | Pearson | July 17, 1951 |
| 2,595,497 | Webster | May 6, 1952 |
| 2,648,805 | Spenke | Aug. 11, 1953 |
| 2,683,840 | Welker | July 13, 1954 |